(12) United States Patent
Schütz

(10) Patent No.: US 7,735,667 B2
(45) Date of Patent: Jun. 15, 2010

(54) SLEEVE NUT OF PLASTIC MATERIAL

(75) Inventor: Udo Schütz, Selters/Westerwald (DE)

(73) Assignee: Protechna S.A., Fribourg (CH)

(*) Notice: Subject to any disclaimer, the term of this patent is extended or adjusted under 35 U.S.C. 154(b) by 787 days.

(21) Appl. No.: 11/203,664

(22) Filed: Aug. 12, 2005

(65) Prior Publication Data

US 2006/0039776 A1 Feb. 23, 2006

(30) Foreign Application Priority Data

Aug. 18, 2004 (DE) .................. 10 2004 039 481
Dec. 3, 2004 (DE) .................. 10 2004 058 252

(51) Int. Cl.
*B65D 45/32* (2006.01)
*F16B 37/08* (2006.01)

(52) U.S. Cl. .............. 215/276; 215/274; 220/319; 411/432

(58) Field of Classification Search ............ 220/319, 220/320, 315; 215/276, 274; 411/432, 433
See application file for complete search history.

(56) References Cited

U.S. PATENT DOCUMENTS

| 4,226,164 A | * | 10/1980 | Carter ................ 411/433 |
| 4,457,445 A | * | 7/1984 | Hanks et al. ........... 220/214 |
| 5,816,454 A | * | 10/1998 | Odessa ................ 222/383.1 |
| 6,460,901 B2 | * | 10/2002 | Rochelle ................ 285/387 |
| 6,666,238 B1 | * | 12/2003 | Crowley et al. .......... 141/286 |

FOREIGN PATENT DOCUMENTS

DE 103 01 517 3/2004

* cited by examiner

*Primary Examiner*—Robin Hylton
(74) *Attorney, Agent, or Firm*—Friedrich Kueffner

(57) ABSTRACT

A plastic screw cap includes two cap halves, which are produced as plastic injection-molded parts and have an internally threaded segment and an inwardly directed ring shoulder segment. The two halves of the screw cap can be pushed together, for example, on the inlet connection of the valve body of a flap valve by tongue-and-groove joints. One cap half has two hook-like ends, each of which is provided with an inwardly sloped clamping sidepiece and a groove for receiving the tongues formed on the two ends of the other half of the screw cap.

1 Claim, 7 Drawing Sheets

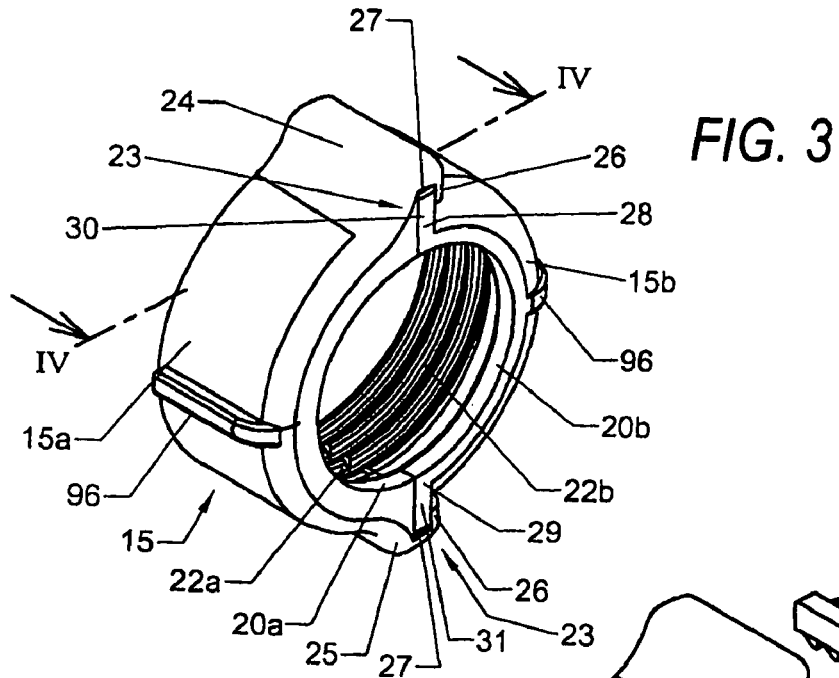
FIG. 3
FIG. 2
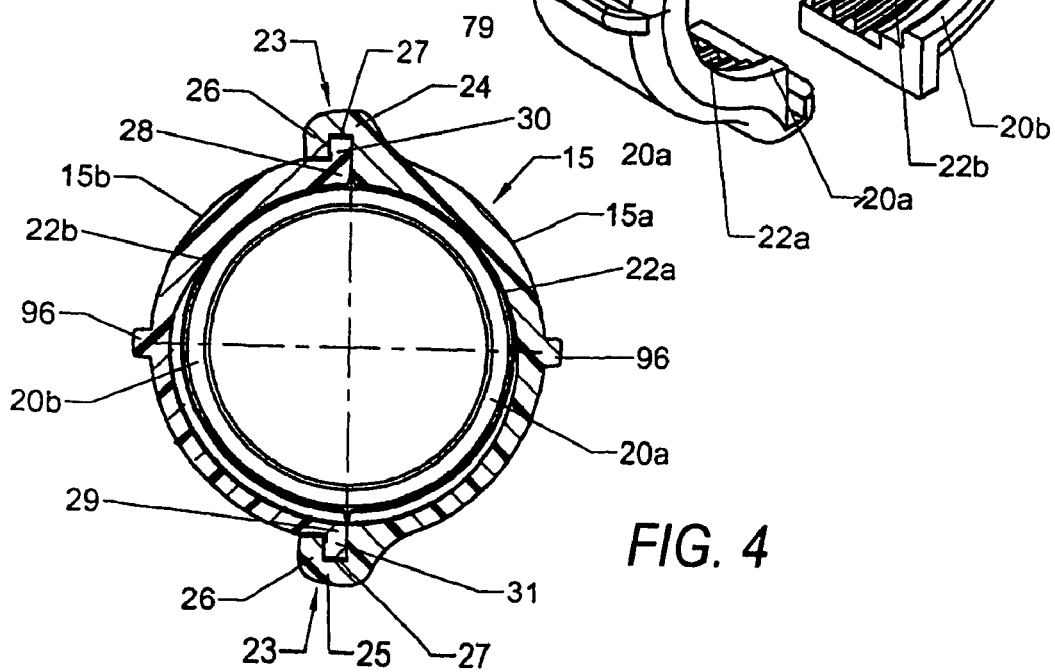
FIG. 4

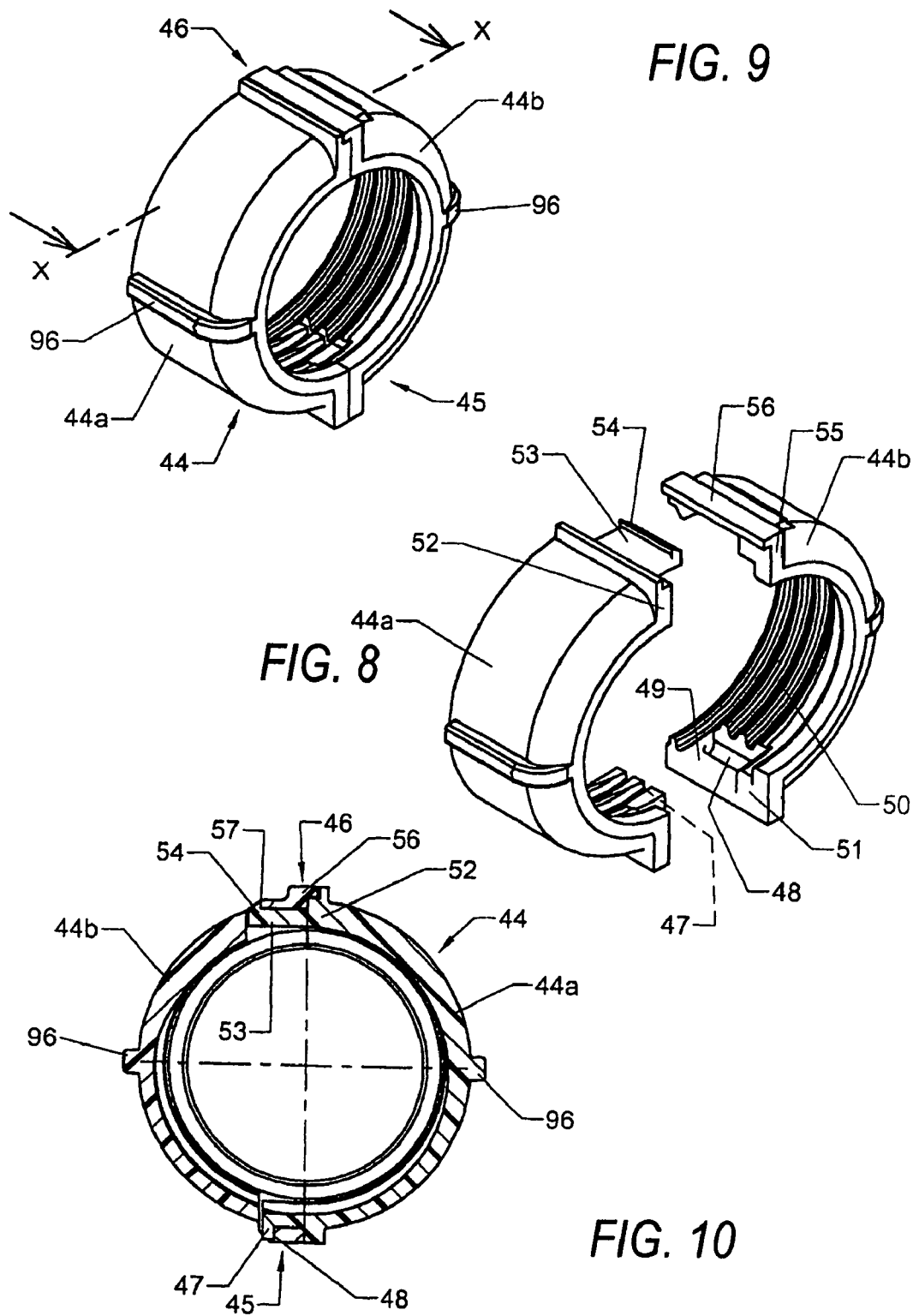

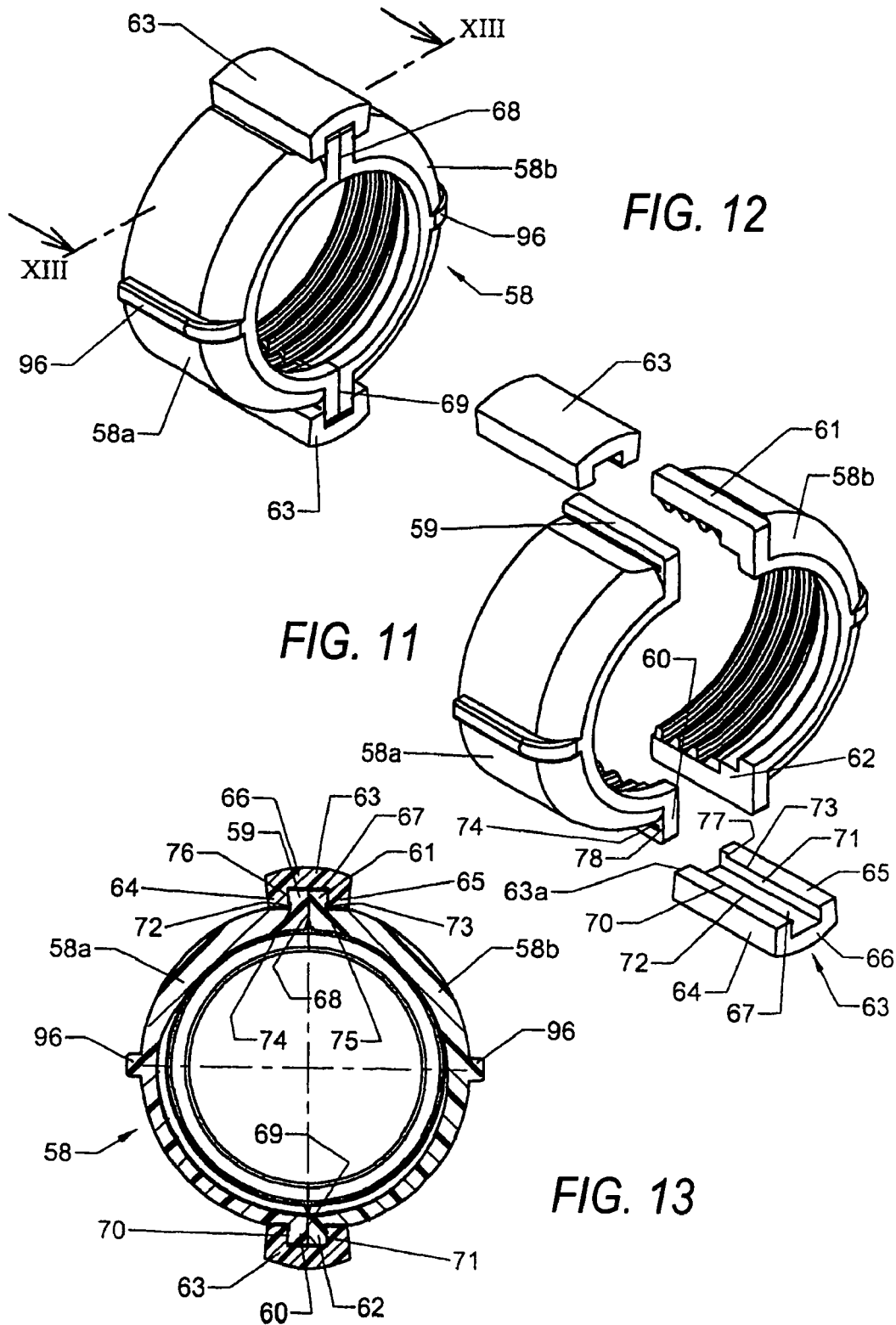

SLEEVE NUT OF PLASTIC MATERIAL

BACKGROUND OF THE INVENTION

1. Field of the Invention

The present invention relates to a plastic screw cap composed of two cap halves on a first component wherein the screw cap is captively held on this first component, and wherein the cap halves each have an internally threaded segment and an inwardly directed ring shoulder segment for making contact with a corresponding collar of the first component, which is to be screwed together with a second component, especially for screwing the valve body of a tapping valve on the externally threaded outlet connection of a plastic or metal shipping and storage tank for liquids and loose bulk material.

2. Description of the Related Art

DE 103 01 517 B3 describes a shipping and storage tank for liquids with an inner plastic tank that stands on a pallet-like frame and an outer cage. The tapping valve of the inner tank is screwed onto the outlet connection of the inner tank by means of a plastic screw cap of a generic type, which is captively mounted on the inlet connection of the valve and is welded together from two cap halves on the inlet connection. When the screw cap is made of aluminum, the two halves of the cap are riveted together on the inlet connection of the tapping valve. This type of captive mounting of a screw cap on the inlet connection of a tapping valve is complicated and time-consuming and increases manufacturing costs.

SUMMARY OF THE INVENTION

The object of the invention is the further development of this general type of screw cap with respect to simplified assembly.

In accordance with the invention, this object is met by a screw cap which has two cap halves produced as plastic injection-molded parts and having an internally threaded segment and an inwardly directed ring shoulder segment. The two halves of the screw cap can be pushed together, for example, on the inlet connection of the valve body of a flap valve by means of tongue-and-groove joints. One cap half has two hook-like ends, each of which is provided with an inwardly sloped clamping sidepiece and a groove for receiving the tongues formed on the two ends of the other half of the screw cap.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIGS. 2 and 3 are perspective views of the separated and the assembled halves of the screw cap used to screw on the flap valve shown in FIG. 1;

FIG. 4 is a sectional view along line IV-IV in FIG. 3;

FIGS. 8 and 9 are perspective views of the separated halves and the assembled halves of a third embodiment of a screw cap;

FIG. 10 is a sectional view along line X-X in FIG. 9;

FIGS. 11 and 12 are perspective views of the separated halves with two clamp fittings and the assembled halves of a fourth embodiment of a screw cap;

FIG. 13 is a sectional view along line XIII-XIII in FIG. 12;

DESCRIPTION OF THE INVENTION

Figure 1:
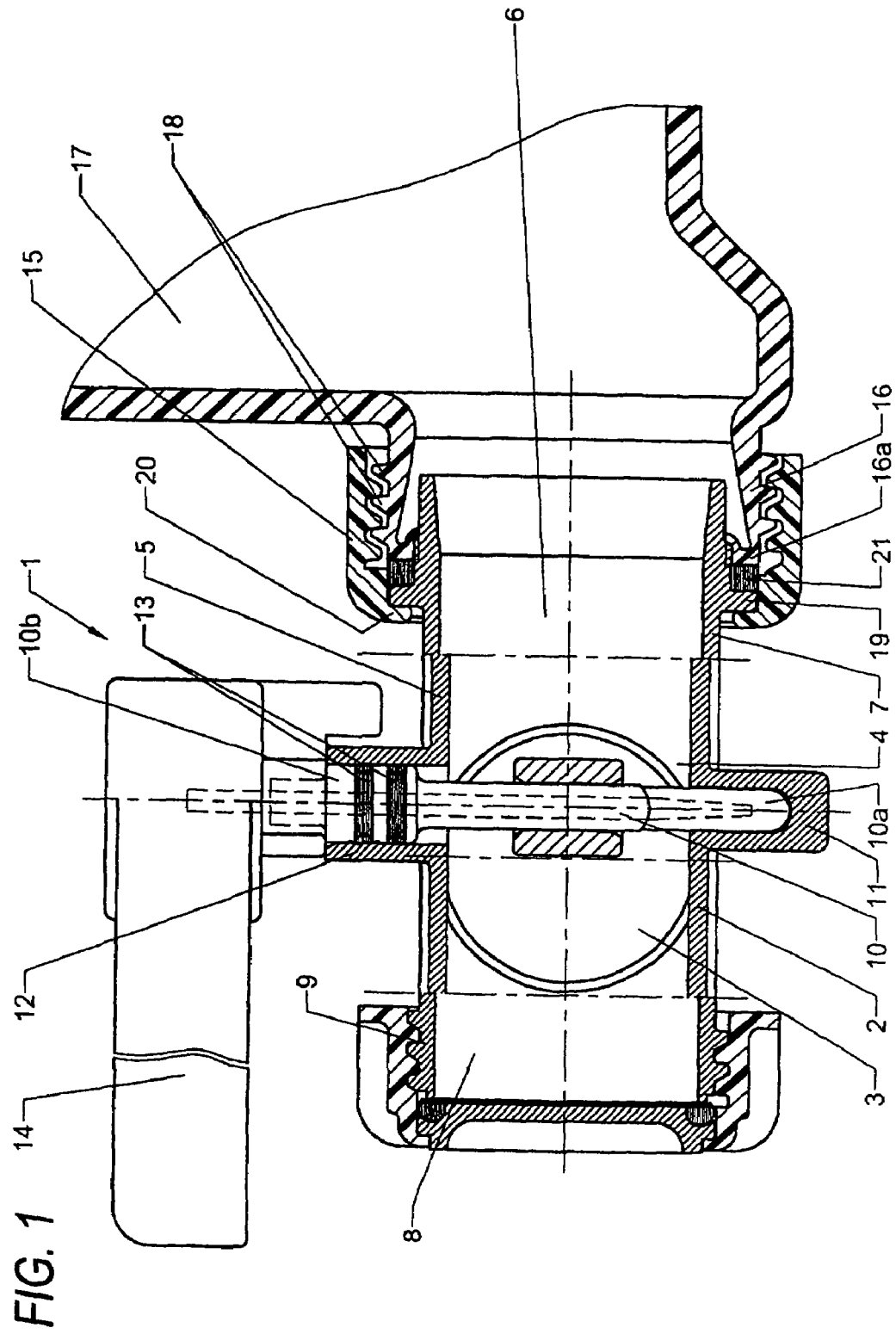
FIG. 1 is a longitudinal section of a flap valve, which is screwed onto the outlet connection of a liquid tank by means of a screw cap, which is shown in detail in FIGS. 2 to 4.

The HDPE (high-density polyethylene) valve body 2 of the flap valve 1 shown in FIG. 1 holds a flap disk 3 for opening and closing the central flow passage 4 of the body chamber 5, which communicates with the inlet channel 6 of the inlet connection 7 and with the outlet channel 8 of the outlet connection 9 of the valve body 2. The flap disk 3 is eccentrically mounted on a rotating shaft 10, whose two ends 10a, 10b are rotatably supported in support studs 11, 12 of the valve body 2, and the upper end 10b of the rotating shaft 3 extends out of the valve body 2 beyond the support stud 12. The rotating shaft 10 is sealed towards the outside by gaskets 13 in the support stud 12. A handle 14 for opening and closing the flap valve 1 is mounted on the end 10b of the rotating shaft 10 of the flap disk 3 that extends from the valve body 2.

The flap valve 1 is mounted on the outlet connection 16 of a liquid tank 17, e.g., a plastic inner tank of a pallet tank, by means of a plastic screw cap 15. The liquid tank 17 is produced by blow molding as a single part with the outlet connection 16, which has an external thread 18.

The screw cap 15 is captively and movably held on the inlet connection 7 of the valve body 2 between a collar 19 of the inlet connection 7 and the support studs 11, 12 of the valve body 2 for the rotating shaft 10 of the flap disk 3.

When the inlet connection 7 of the valve body 2 is pulled into the outlet connection 16 of the liquid tank 17 by screwing on the screw cap 15, which is captively held on the inlet connection 7 of the valve body and has a ring shoulder 20 that contacts the collar 19 of the inlet connection 7, a gasket 21 seated on the inlet connection 7 is clamped on the outlet connection 16 between the collar 19 and the outer end 16a of the liquid tank 17 and thus seals the valve body 2 of the flap valve 1 from the liquid tank 17.

The screw cap 15 illustrated in FIGS. 2 to 4 consists of two halves 15a, 15b, which are produced as plastic injection-molded parts and have an internally threaded segment 22a, 22b and an inwardly directed ring shoulder segment 20a, 20b. The two halves 15a, 15b of the screw cap 15 can be pushed together on the inlet connection 7 of the valve body 2 by means of tongue-and-groove joints 23. One cap half 15a has two hook-like ends 24, 25, each of which is provided with an inwardly sloped clamping sidepiece 26 and a groove 27 for receiving the tongues 30, 31 formed on the two ends 28, 29 of the other half 15b of the screw cap 15.

Figures 5, 6, 7:
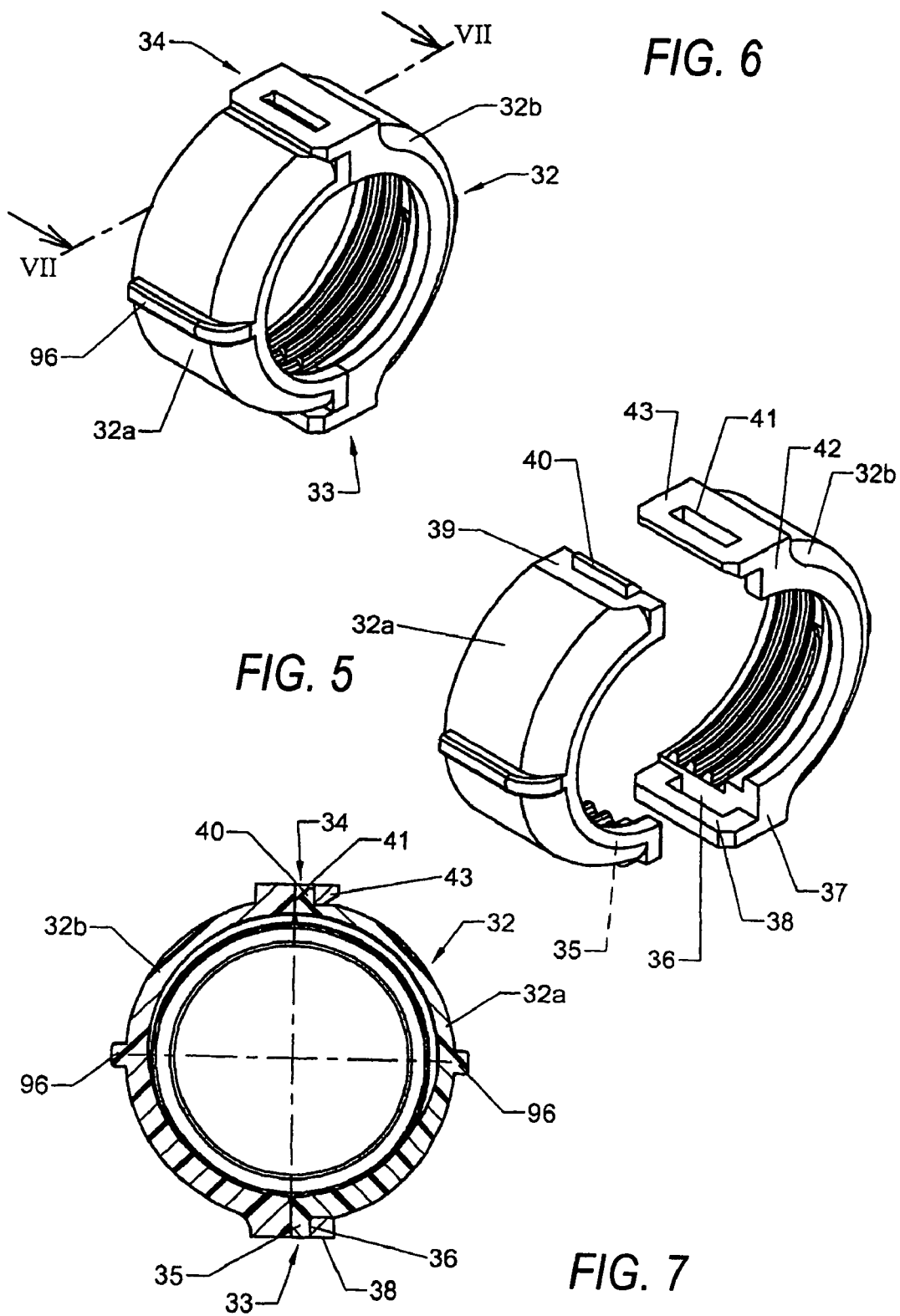
FIGS. 5 and 6 are perspective views of the separated halves and the assembled halves of a second embodiment of a screw cap.
FIG. 7 is a sectional view along line VII-VII in FIG. 6.

The screw cap 32 illustrated in FIGS. 5 to 7 has two halves 32a, 32b, which are assembled by means of a hook connection 33 and a clip connection 34. The first half 32a of the screw cap 32 has a hook-like end 35 for hooking into a corresponding insertion hole 36 of a bracket 38 formed on one end 37 of the second half 32b of the screw cap 32. A boss 40 is formed on the other end 39 of the first half 32a of the screw cap 32. The boss 40 snaps into a corresponding hole 41 of a bracket 43 formed on the other end 42 of the second half 32b of the screw cap 32.

The halves 44a, 44b of the screw cap 44 illustrated in FIGS. 8 to 10 are joined by means of a hook connection 45 and a clip connection 46. The first half 44a of the screw cap is provided with a hook-like end 47 for hooking into an insertion hole 48 of a recess 49 of the internally threaded segment 50 at one end 51 of the second half 44b of the screw cap. A catch tongue 53 with a catch edge 54 is formed on the other end 52 of the first half 44a of the screw cap. When the two halves 44a, 44b of the screw cap are assembled, the catch tongue 53 catches under a stepped holding web 56 formed on the other end 55 of the second half 44b of the screw cap, and its catch edge 54 locks with the rear side 57 of the holding web 56.

The screw cap 58 illustrated in FIGS. 11 to 13 consists of two halves 58a, 58b with push strips 59, 60; 61, 62 formed on the ends and of two clamp fittings 63 with a groove 67 formed by two clamping sidepieces 64, 65 and a connecting web 66 for pushing onto the tongues 68, 69, which are formed by two push strips 59, 61 and 60, 62, respectively, of the assembled halves 58a, 58b of the screw cap.

To prevent the clamp fittings 63 from coming off, thin webs 72, 73 are formed on the inner edges 70, 71 of the clamping sidepieces 64, 65 of the clamp fittings 63. When the clamp fittings 63 are pushed onto the tongues 68, 69 formed by the push strips 59, 61 and 60, 62, respectively, of the two halves 58a, 58b of the screw cap, the thin webs 72, 73 fit into grooves 74, 75 in the outer edges 76 of the push strips 59, 61; 60, 62.

The webs 72, 73 are broken off at the slip-on end 63a of the clamp fittings 63 to form a stop 77, which interacts with an opposing stop 78 formed on the end of the grooves 74, 75 in the push strips 59, 60; 61, 62 of the two halves 58a, 58b of the screw cap to allow exact positioning of the clamp fittings 63 when they are pushed onto the tongues 68, 69 of the assembled halves 58a, 58b of the screw cap and to secure the clamp fittings 63.

Figure 14:
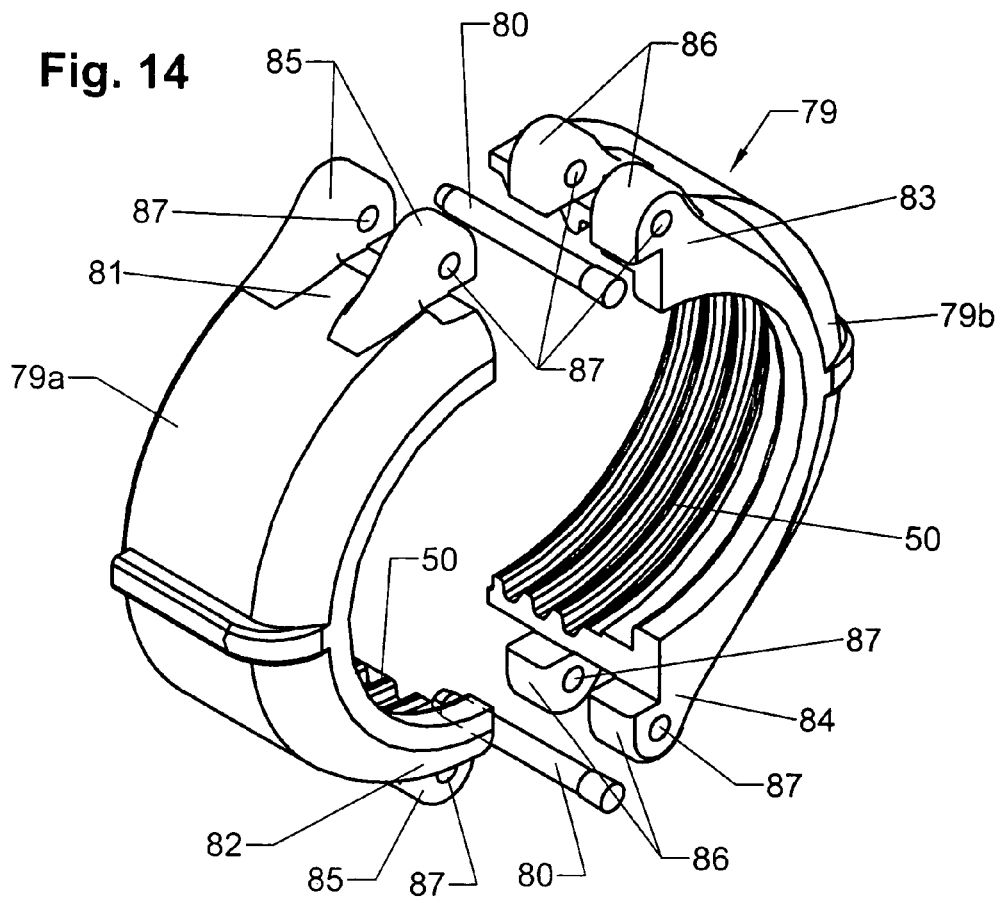
FIGS. 14 and 15 and FIGS. 16 and 17 are perspective views of the separated halves and the assembled halves of a fifth embodiment and a sixth embodiment, respectively, of a screw cap.
Figure 15:
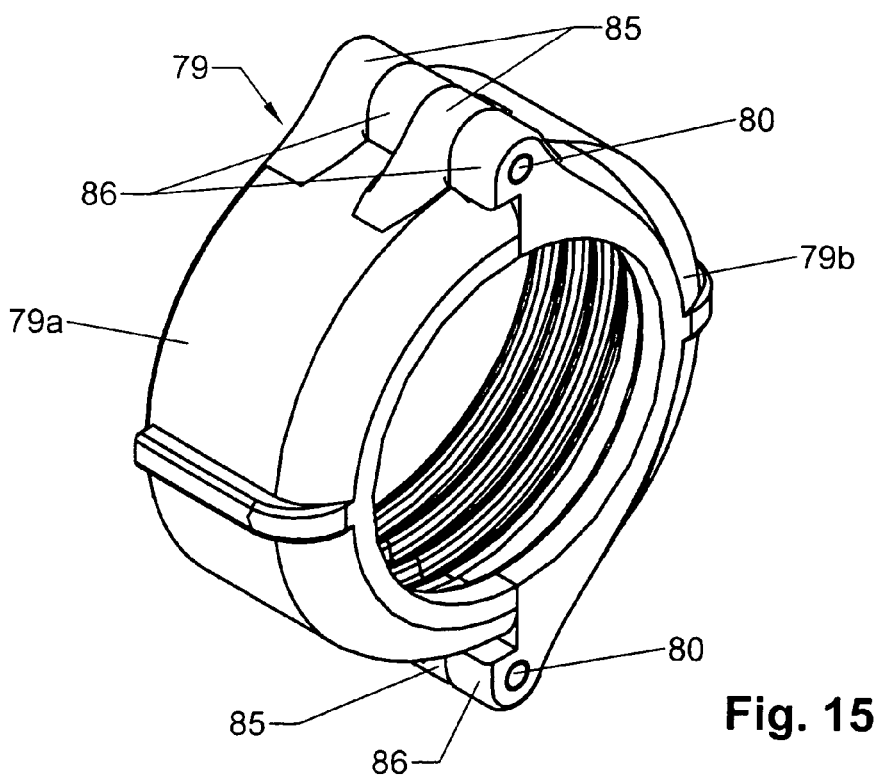

The screw cap 79 illustrated in FIGS. 14 and 15 has two halves 79a, 79b that can be assembled by means of connecting pins 80. Each half 79a, 79b of the screw cap has an internally threaded segment 50. Two extensions 85; 86 with insertion holes 87 are formed on each end 81, 82; 83, 84 of the halves 79a, 79b of the screw cap. The extensions 85; 86 extend circumferentially beyond the ends 81, 82; 83, 84. The extensions 85 of the first half 79a of the screw cap are offset relative to the extensions 86 of the second half 79b of the screw cap in such a way that when the two halves 79a, 79b are joined, the extensions 85, 86 interlock, and their insertion holes 87 become aligned with one another to allow the insertion of a connecting pin 80.

Figure 16:
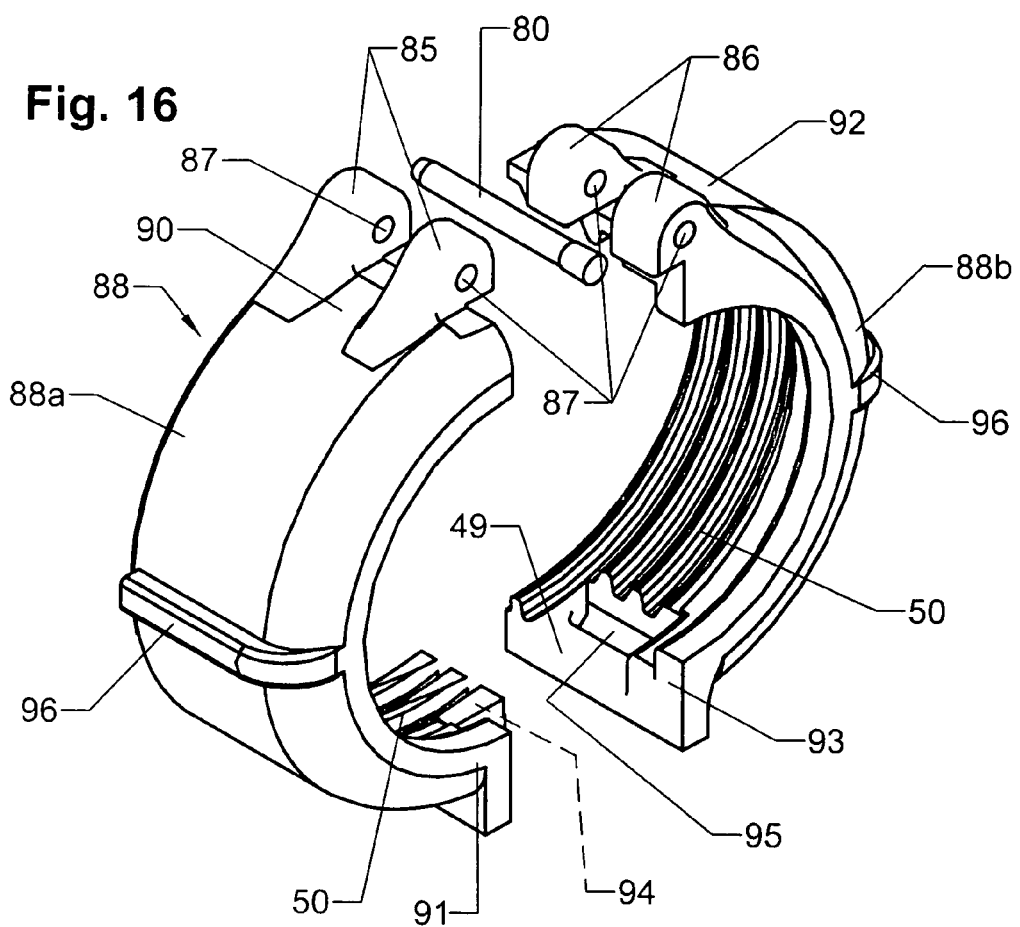
Figure 17:
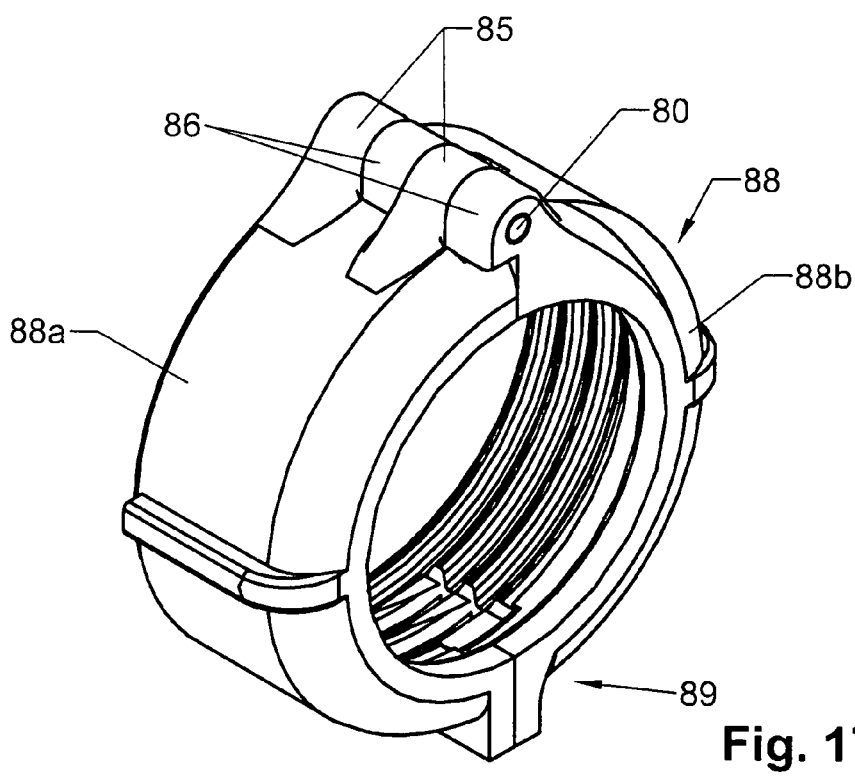

The screw cap 88 illustrated in FIGS. 16 and 17 consists of two halves 88a, 88b that can be assembled by means of a connecting pin 80 and a hook connection 89. Each half 88a, 88b of the screw cap has an internally threaded segment 50. Extensions 85, 86 with insertion holes 87 are formed on one of the ends 90, 92 of the two halves 88a, 88b of the screw cap. The extensions 85, 86 extend circumferentially beyond the ends 90, 92 of the halves 88a, 88b of the screw cap. The extensions 85 of the first half 88a of the screw cap are offset relative to the extensions 86 of the second half 88b of the screw cap in such a way that when the two halves 88a, 88b are joined, the extensions 85, 86 interlock, and their insertion holes 87 become aligned with one another to allow the insertion of a connecting pin 80. A hook 94 is formed on the other end 91 of the first half 88a of the screw cap 88 for hooking into an insertion hole 95 of a recess 49 of the threaded segment 50 in the other end 93 of the second half 88b of the screw cap 88.

The various types of screw caps 15, 32, 44, 58, 88 are provided with gripping ribs 96 along their circumference as an assembly aid.

While specific embodiments of the invention have been shown and described in detail to illustrate the inventive principles, it will be understood that the invention may be embodied otherwise without departing from such principles.

I claim:

1. A plastic screw cap comprising two cap halves on a first component and captively held on the first component, wherein the cap halves each have an internally threaded segment and an inwardly directed ring shoulder segment for making contact with a corresponding collar of the first component, which is to be screwed together with a second component, especially for screwing a valve body of a tapping valve on an externally threaded outlet connection of a plastic or metal shipping and storage tank for liquids and loose bulk material, wherein the two halves are configured to be assembled by means of a hook connection (33) and a clip connection (34), wherein a first half (32a) of the screw cap (32) has a hook-like end (35) for hooking into a corresponding insertion hole of a bracket formed on one end of the second half of the screw cap, wherein a boss is formed on the other end of the first half of the screw cap, and wherein the boss is configured to engage radially into a corresponding hole of a bracket formed on the other end of the second half of the screw cap.

* * * * *